(12) United States Patent
Foley et al.

(10) Patent No.: US 10,074,448 B2
(45) Date of Patent: Sep. 11, 2018

(54) SUBMERSIBLE MACHINE STRUCTURED TO CARRY A TOOL TO A LIMITED ACCESS LOCATION WITHIN A NUCLEAR CONTAINMENT

(75) Inventors: Kevin J. Foley, Chattanooga, TN (US); Charles R. Barrett, Ooltewah, TN (US); Roy May, Hixson, TN (US)

(73) Assignee: Westinghouse Electric Company LLC, Cranberry Township, PA (US)

( * ) Notice: Subject to any disclaimer, the term of this patent is extended or adjusted under 35 U.S.C. 154(b) by 1263 days.

(21) Appl. No.: 13/230,434

(22) Filed: Sep. 12, 2011

(65) Prior Publication Data

US 2012/0099692 A1    Apr. 26, 2012

Related U.S. Application Data

(60) Provisional application No. 61/405,298, filed on Oct. 21, 2010, provisional application No. 61/405,245, filed on Oct. 21, 2010.

(51) Int. Cl.
*G21C 17/013* (2006.01)
*G21C 17/003* (2006.01)
*G21C 19/16* (2006.01)

(52) U.S. Cl.
CPC ......... *G21C 17/013* (2013.01); *G21C 17/003* (2013.01); *G21C 19/16* (2013.01)

(58) Field of Classification Search
None
See application file for complete search history.

(56) References Cited

U.S. PATENT DOCUMENTS

| | | | |
|---|---|---|---|
| 6,076,407 A | 6/2000 | Levesque et al. | |
| 6,526,114 B2 | 2/2003 | Paillaman et al. | |
| 7,512,207 B2 | 3/2009 | Smith et al. | |
| 7,543,512 B2 | 6/2009 | Smith et al. | |
| 7,715,516 B2 | 5/2010 | Smith et al. | |
| 2006/0226668 A1* | 10/2006 | Smith et al. | 294/86.1 |

(Continued)

OTHER PUBLICATIONS

Tangent plane of a ball, a cylinder and a cone. Dr. Yury Berengard. 2002-2007. <http://www.bymath.com/studyguide/geo/sec/geo19.htm>.*

*Primary Examiner* — Jack W Keith
*Assistant Examiner* — Lily Crabtree Garner
(74) *Attorney, Agent, or Firm* — Richard J. Coldren; Westinghouse Electric Company LLC (57) ABSTRACT

A tool for delivery of a testing element to a limited access location within a nuclear containment includes a rotation apparatus having a connection element that is configured to have an aperture that is formed generally centrally therein. A submersible machine is structured to carry the tool to a limited access location within a nuclear containment. The submersible machine includes a mount apparatus configured to be movably clamped onto a steam dam of a nuclear reactor apparatus and to drive the submersible machine circumferentially along the steam dam to inspect a plurality of jet pumps or other limited access locations of the nuclear reactor apparatus. The improved submersible machine advantageously further includes an adjustment table between the mount apparatus and a frame that carries the tool to enable rapid accurate positioning of the frame, and thus the tool, once the submersible machine has been mounted to the steam dam.

8 Claims, 8 Drawing Sheets

(56) References Cited

U.S. PATENT DOCUMENTS

2007/0125190 A1* 6/2007 Morris et al. ............... 73/865.8
2007/0146480 A1* 6/2007 Judge et al. .................... 348/83
2007/0189858 A1* 8/2007 Nakagawa et al. ........... 405/190
2008/0317192 A1* 12/2008 Rowell et al. ................ 376/249
2010/0242247 A1* 9/2010 Jones et al. ............... 29/402.01
2010/0275694 A1* 11/2010 Roberts .......................... 73/637

* cited by examiner

SUBMERSIBLE MACHINE STRUCTURED TO CARRY A TOOL TO A LIMITED ACCESS LOCATION WITHIN A NUCLEAR CONTAINMENT

CROSS REFERENCE TO RELATED APPLICATIONS

This application is related to and claims priority from U.S. Provisional Patent Application Ser. No. 61/405,245, filed Oct. 21, 2010, entitled "Apparatus for Bore Inspection from the Inside Diameter" and U.S. Provisional Patent Application Ser. No. 61/405,298, filed Oct. 21, 2010, entitled "Apparatus and Method for Servicing Areas Surrounding Nuclear Boiling Water Reactor Core and Annulus Regions", the disclosures of which are incorporated herein by reference.

BACKGROUND OF THE INVENTION

Field

The invention relates generally to nuclear power plants and, more particularly, to the inspection and of evaluation of components within the containment of a nuclear power plant.

Description of the Related Art

Nuclear power plants are generally well known. Nuclear power plants can generally be stated as comprising a reactor that includes one or more fuel cells and a coolant system that drives a steam turbine which operates an electrical generator. The various components of the nuclear power plant are subject to wear from mechanical vibration, corrosion, and other mechanisms. It thus is necessary to periodically inspect the components for wear in order to preferably avoid failure of the components. While numerous methodologies have been employed for performing such inspection, such methodologies have not been without limitation.

Since reactors typically are situated within a containment, such reactors can often have areas of limited access that nevertheless need to be inspected on a periodic basis. A known methodology that has been employed for inspecting components situated at limited access locations within a nuclear containment has been to deliver to a limited access location an elongated tool having one or more flexible regions, with the tool carrying a testing element that is used to perform the inspection process. The elongated tool typically includes a plurality of elongated portions each separated from one another by a flexible portion, with at least one of the portions having expandable legs that can be deployed and caused to engage an interior surface of a fluid flow channel. The component carrying the testing element can then be rotated (with respect to the portion having the expandable legs) to perform the inspection operation. While such methodologies have been generally effective for their intended purposes, they have not been without limitation.

Since such tools typically have one element that is rotatable with respect to another element, the electrical connection between the testing element and the non-rotating components have needed to include a number of moveable connection devices such as slip rings and the like, which have resulted in intermittent losses of testing data. Moreover, since a component of such a tool is typically both rotatable and pivotable with respect to other portions of the tool, the data cable that extends from the testing element across the regions of such rotation and pivoting can become stretched and its conductors occasionally broken, which results in loss of signal.

Known methodologies of inserting the tool into the limited access locations have included manual insertion and the use of a submersible device to carry the tool to the limited access location. Manual insertion requires extensive effort and patience and must be performed by highly skilled individuals. The use of submersible devices has increased the speed of inspection somewhat, but the carrying of the tool to a limited access location with a submersible device has still required significant time and effort to properly position the submersible device in order to clamp it to the reactor in the vicinity of the limited access location and to enable it to insert the tool into the limited access location. It thus would be desirable to provide a system that overcomes such known shortcomings in the relevant art.

SUMMARY OF THE INVENTION

Accordingly, an improved tool for delivery of a testing element to a limited access location within a nuclear containment includes a rotation apparatus having a connection element that is configured to have an aperture that is formed generally centrally therein. The aperture is structured to receive therein a cable that extends from a testing element, which that avoids the need to use slip rings or similar devices to permit the testing element to be carried on a pivotable and rotatable structure. Moreover, an improved submersible machine is structured to carry the tool to a limited access location within a nuclear containment. The submersible machine includes a mount apparatus that is configured to be movably clamped onto a steam dam of a nuclear reactor apparatus and to drive the submersible machine circumferentially along the steam dam to inspect a plurality of jet pumps or other limited access locations of the nuclear reactor apparatus. The improved submersible machine advantageously further includes an adjustment table between the mount apparatus and a frame that carries the tool to enable rapid accurate positioning of the frame, and thus the tool, once the submersible machine has been mounted to the steam dam.

Accordingly, an aspect of the invention is to provide an improved tool for delivering a testing element of a testing apparatus to a limited access location within a nuclear containment.

Another aspect of the invention is to provide an improved submersible machine structured to carry such a tool to such a limited access location.

These and other aspects of the invention can be generally described as relating to an improved submersible machine structured to carry a tool to a limited access location within a nuclear containment and to insert at least a portion of the tool into the limited access location. The submersible machine can be generally stated as including a transport portion, an adjustment table, a mount apparatus, and an adjustable mast. The transport portion can be generally stated as including a frame, at least a first flotation device disposed on the frame, and a number of thrusters mounted to the frame and structured to be actuated to move the frame through a fluid environment within the nuclear containment. The adjustment table can be generally stated as including a first platform apparatus and a second platform apparatus connected together, with the first platform apparatus being connected with the frame, and with at least one of the first platform apparatus and the second platform apparatus being movable in a plane with respect to the other of the first platform apparatus and the second platform apparatus. The mount apparatus is connected with the second platform apparatus and can be generally stated as including a pair of brace elements that are cooperable to engage therebetween a portion of a structure within the nuclear containment and to thereby mount the mount apparatus to the structure. The adjustable mast is mounted to the frame and structured to carry the tool

BRIEF DESCRIPTION OF THE DRAWINGS

A further understanding of the invention can be gained from the following Detailed Description when read in conjunction with the accompanying drawings in which:

FIG. 5 is a perspective view of a plug apparatus that cooperates with the connection element of FIG. 3;

Similar numerals refer to similar parts throughout the specification.

DETAILED DESCRIPTION

Figure 1:
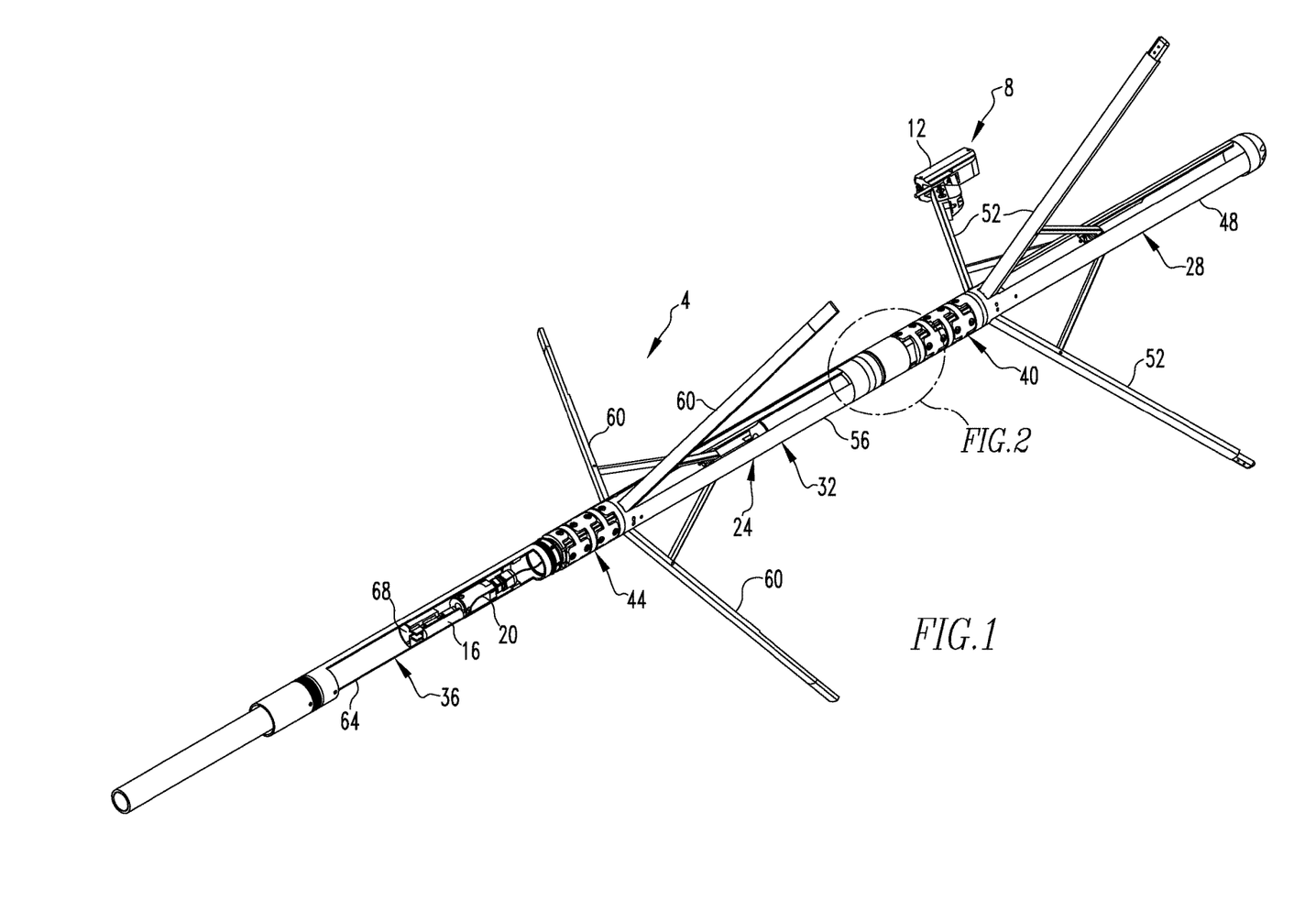
FIG. 1 is a perspective view of an improved tool in accordance with the invention for delivering a testing element into a limited access location within a containment of a nuclear reactor.

An improved tool 4 in accordance with the disclosed and claimed concept is depicted generally in FIG. 1. The tool 4 is structured to carry a testing apparatus 8 into a limited access location within a nuclear containment. More particularly, the testing apparatus 8 includes a testing element 12 having a number of sensors that are not expressly depicted herein, a connector 16 that is mounted to the tool 4, and a cable 20 that extends between the testing element 12 and the connector 16. The tool 4 is elongated and has a number of flexible regions therein as will be described in greater detail below.

The tool 4 can be said to include an elongated frame apparatus 24 that includes an elongated testing portion 28, an elongated support portion 32, and an elongated umbilical portion 36. Moreover, the frame apparatus 24 includes a first pivot apparatus 40 and a second pivot apparatus 44.

As can be understood from FIG. 1, the testing portion 28 includes an elongated testing frame portion 48 and a plurality of expandable mounting arms 52. The testing element 12 is depicted in FIG. 1 as being mounted on one of the mounting arms 52.

The support portion 32 can be said to include an elongated support frame portion 56 and plurality of outwardly expandable bracing arms 60. The bracing arms 60 are configured to engage, for instance, an interior surface of a flow channel, such as the inside of a pipe or other such structure. Most typically, the bracing arms 60, when expanded into engagement with a flow channel or other structure, provide support to the entire tool 4 and enable rotation of the testing portion 28 with respect to the support portion 32, as will be described in greater detail below.

The umbilical portion 36 includes an elongated umbilical frame portion 64 and a cooperable connector 68 that is electrically cooperable with the connector 16 of the testing apparatus 8. The electrical connection between the connector 16 and the cooperable connector 68 enable electronic signals from the testing element 12 to be delivered to a remote location through an umbilical cable (not expressly depicted herein) that extends between the tool 4 and a device such as a testing machine (not expressly depicted herein).

As can further be understood from FIG. 1, the first pivot apparatus 40 is situated between the testing portion 28 and the support portion 32. The first pivot apparatus 40 includes a number of universal joint structures and enables the testing portion 28 to be pivoted with respect to the support portion 32. As employed herein, the expression "a number of" and variations thereof shall refer broadly to any non-zero quantity, including a quantity one. The second pivot apparatus 44 likewise includes a number of universal joint elements and similarly enables the support portion 32 to be pivotable with respect to the umbilical portion 36.

The frame apparatus 24 further includes a rotation apparatus 72 that is situated between the testing portion 28 and the support portion 32, and it permits the testing portion 28 to be rotated about its axis of elongation with respect to the support portion 32. Moreover, the rotation apparatus 72 is connected with the first pivot apparatus 40.

Figure 2:
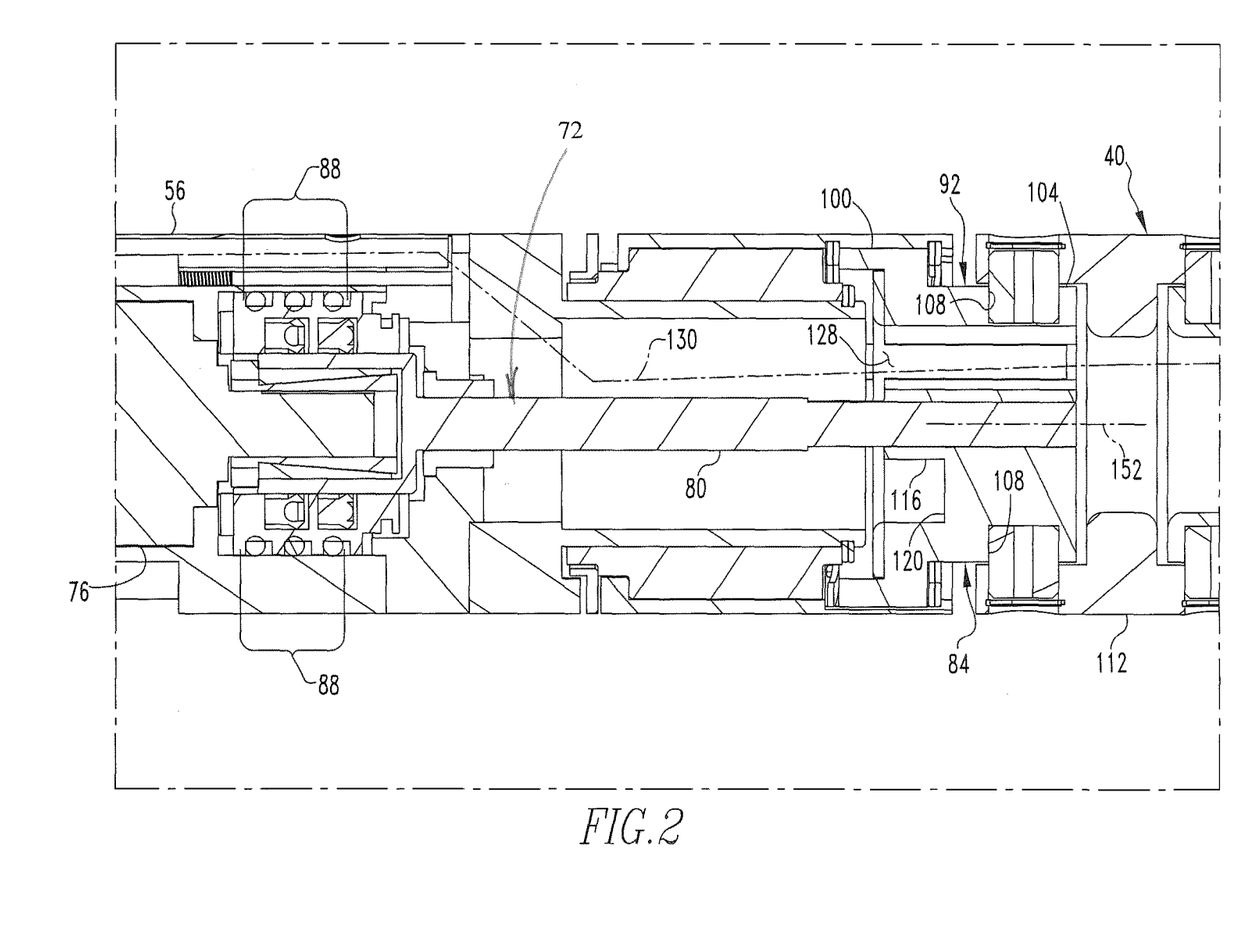
FIG. 2 is enlarged elevational view, partially cut away, of an indicated portion of FIG. 1.

As can be understood from FIG. 2, the rotation apparatus 72 includes a schematically depicted motor 76, a rotatable shaft 80, and a connection apparatus 84. A number of seal elements that are indicated generally with the numeral 88 extend between the rotatable shaft 80 and the support frame portion 56 in order to protect the motor 76 from contamination by water within the nuclear containment. The motor 76 is connected with the rotatable shaft 80 which is, in turn, connected with the connection apparatus 84. Rotational movement provided by motor 76 is thus communicated from the connection apparatus 84 into the first pivot apparatus 40 and onward to the testing portion 28.

Figure 3:
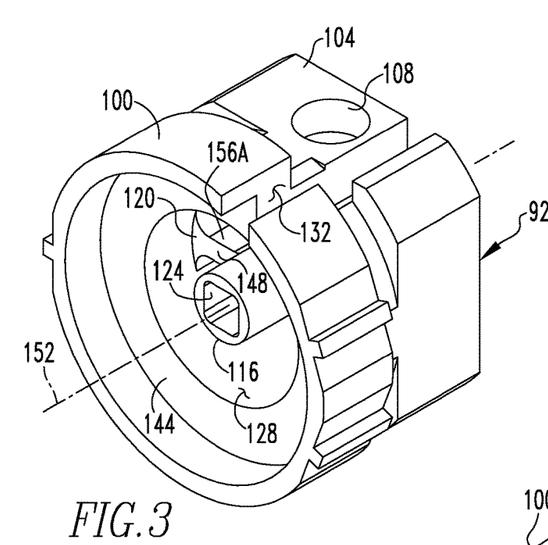
FIG. 3 is a perspective view of a connection element of the tool of FIG. 1.
Figure 4:
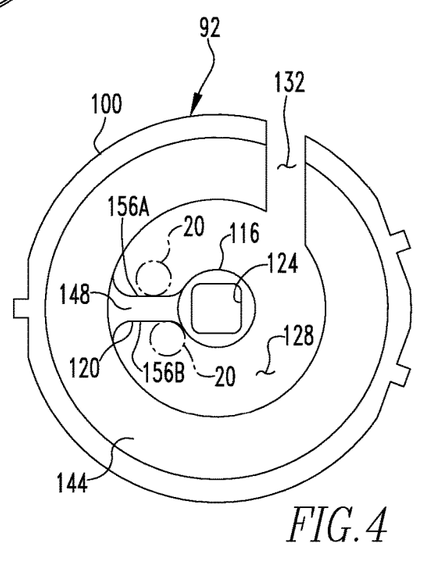
Figure 5:
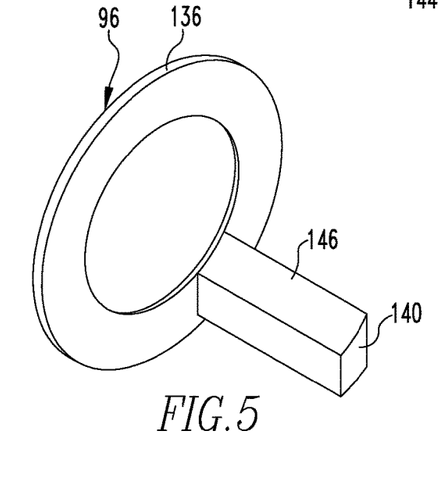
FIG. 5 is a front elevational view of the connection element of FIG. 3.

As can be understood from FIGS. 2-5, the connection apparatus 84 includes a connection element 92, which is depicted in FIGS. 2-4, and a plug apparatus 96 that is depicted in FIG. 5. As can be seen in FIG. 3, the connection element 92 includes a lateral support 100 and a longitudinal support 104 that are connected together and that have a longitudinally oriented opening formed therein. The lateral support 100 has a roughly circular profile whereas the longitudinal support 104 has a roughly rectangular profile. The circular profile of the lateral support 100 enables it to be rotatably disposed in an end of support frame portion 56 that is situated adjacent the testing portion 28. On the other hand, the rectangular profile of the longitudinal support 104 enables it to be connected with the first pivot apparatus 40. More particularly, and as can be understood from FIGS. 2 and 3, the longitudinal support 104 has a pair of mounting holes 108 formed therein that are connectable via bolts or other fasteners with a universal joint element 112 of the first pivot apparatus 40. Rotational forces from the rotatable shaft 80 between the support portion 32 and the testing portion 28 are thus transferred through the connection element 92.

As can be understood from FIGS. 3 and 4, the connection element 92 further includes a hub 116 and a lug 120, with the lug 120 extending between the hub 116 and interior surface of the lateral and longitudinal supports 100 and 104. The lug 120 has a square opening 124 formed therein that is configured to receive a correspondingly shaped end of the rotatable shaft 80. The connection element 92 thus can be said to be formed with an aperture 128 formed therein that extends between the hub 116 and the lateral and longitudinal supports 100 and 104 and which is of a substantially annular shape.

The aperture 128 is advantageously configured to movably receive the cable 20 therein, which avoids the need for slip rings and the like between the testing element 12 and, for instance, the relatively stationary umbilical portion 36. The rotation apparatus 72 enables the testing portion 28 to be pivoted about its axis of elongation through an angle of at least about 360 degrees with respect to the support portion 32 during a testing operation. Two exemplary positions of the cable 20 are indicated in FIG. 4 in phantom lines at two different rotational extremes of the connection element 92. By providing the annular aperture 128 very close an axis of rotation 152 of the connection element 92, loading of the cable 20 is limited generally to only torque about its own axis of elongation and is well within the elastic limits of cable 20 to avoid breakage of any of the wires within cable 20.

That is, the lug 120 has a pair of lateral surfaces 156A and 156B at opposite sides thereof. At one rotational extreme of the connection element 92 with respect to the support frame portion 56, the cable 20 only slightly touches the lateral surface 156A and receives minimal stresses from such engagement. Similarly, at an opposite rotational extreme, which may be as much as 360 degrees or more of rotation away from the first extreme, the cable 20 only slightly touches the lateral surface 156B and receives substantially no meaningful stress therefrom. Thus, the provision of the annular aperture 128 allows full rotation of the testing portion 28 with respect to the support portion 32 substantially without imposing any meaningful stress on the cable 20 and staying well within the elastic limits of the cable 20. This advantageously avoids failure of the cable due to breakage and the like during operation of the tool 4. This likewise avoids the need to employ slip rings between, say, the testing portion 28 and the support portion 32 to enable communication of electronic signals between the testing element 12 and the connector 16. This is especially important since the cable 20 follows a somewhat tortuous path, as is indicated at the phantom line 130 in FIG. 2 in extending between the region of the motor 76 and the first pivot apparatus 40.

As can further be understood from FIGS. 3 and 4, the connection element 92 is formed with an access passage 132 that enables communication between the aperture 128 and the exterior of connection element 92. In this regard, it can be understood that testing apparatus 8 is configured with the cable 20 being substantially unremovable from the testing apparatus 12 and the connector 16 for reasons of maintaining the integrity of the electrical connections between testing element 12 and connector 16. As such, if the testing apparatus should somehow fail during a testing operation and need to be replaced, the cable 20 can advantageously be removed from aperture 128 by being received through access passage 132, and the cable 20 of the replacement testing apparatus 8 can then be received back through the access passage 132 for reception within aperture 128, which is effectively within the interior of connection element 92.

As is best understood from FIG. 5, the plug apparatus 96 includes an annular support 136 and a plug element 140 connected together. When the tool 4 is fully assembled, the annular support 136 is received against an annular surface 144 of the lateral support 100 portion of the connection element 92, and the plug element 140 is received in the access passage 132. The plug element 140 includes its own surface portion 146 that becomes a part of the arcuate interior surface of the lateral and longitudinal supports 100 and 104 of the connection element 92. The surface portion 146 of the plug element 140 thus additionally serves to retain the cable 20 at a location as near as possible to the axis of rotation 152 of the connection element 92 during rotation of the testing portion 28 with respect to the support portion 32.

Further with regard to the limited extent to which the lug 120 engages the cable 120 at the extremes of rotation of the connection element 92, it is noted that the lug 20, as can be seen in FIG. 3 has a leading surface 148 situated between the lateral surfaces 156A and 156B and which is spaced from the annual surface 144. As such, the lug 120 is of a relatively small size and extends less than the entire longitudinal extent of the connection element 92. This places even less of a load on the cable 20 when extremes of rotation are reached during a testing operation because the lug 120 is not only of a small dimension in a circumferential direction but is also of a small dimension in a longitudinal direction.

It is noted that the connection apparatus 84 is depicted herein as having the aperture 128 and the access passage 132 in order to reduce stresses on the cable 20 and to permit the testing apparatus 8 to be replaced with another similar testing apparatus 8. That is, the connection apparatus 84 is configured to enable the cable 20 to be disposed within the interior of tool 4 while still being easily replaceable. It is noted, however, that numerous other components of tool 4 are configured in a fashion similar to the connection apparatus 84, and all such components enable the cable 20 to experience limited stresses during a testing operation while still enabling the testing apparatus 8 to be replaceable as needed. The tool 4 thus is advantageously configured to provide reliability of testing signals without the need for slip rings and the like while still allowing the testing apparatus 8 to be replaced as needed.

Figure 6:
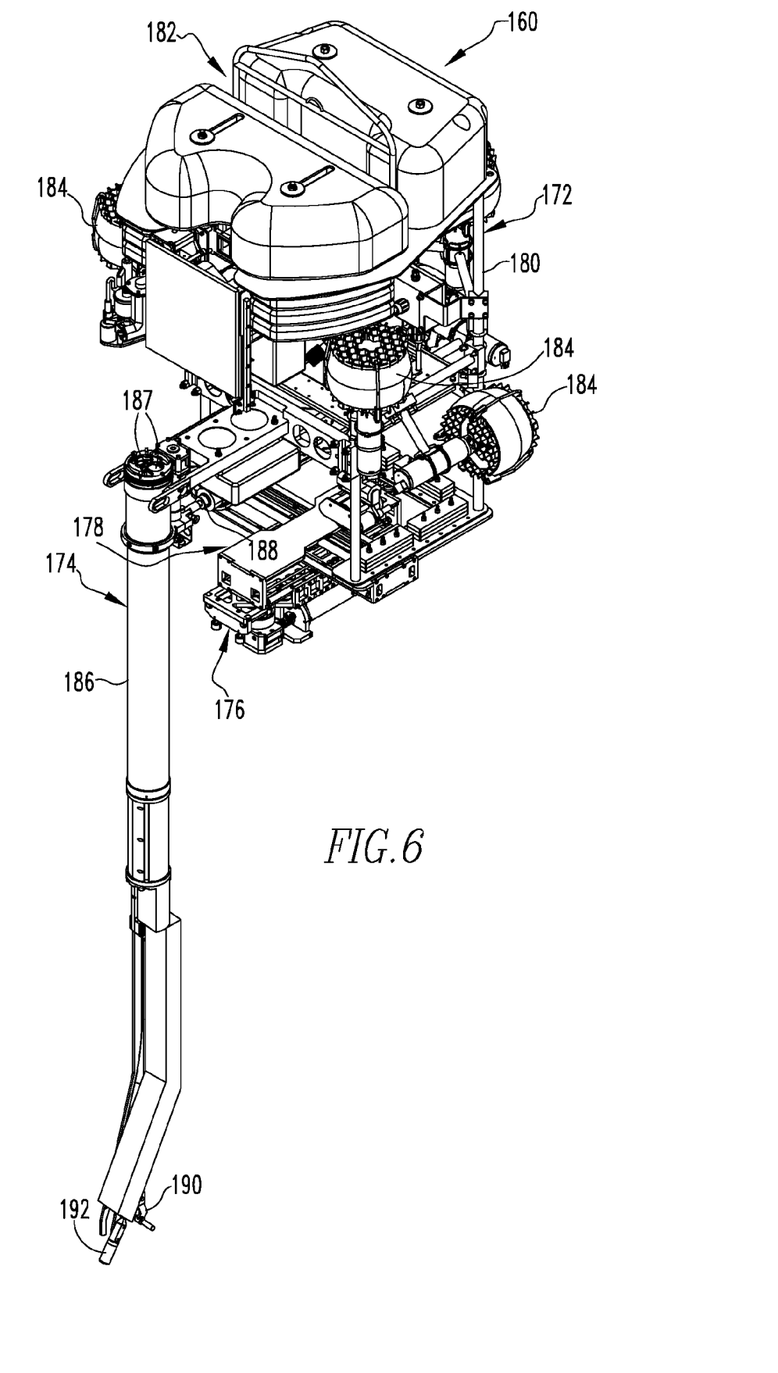
FIG. 6 is a perspective view of an improved submersible machine in accordance with the invention that is structured to carry the tool of FIG. 1.
Figure 7:
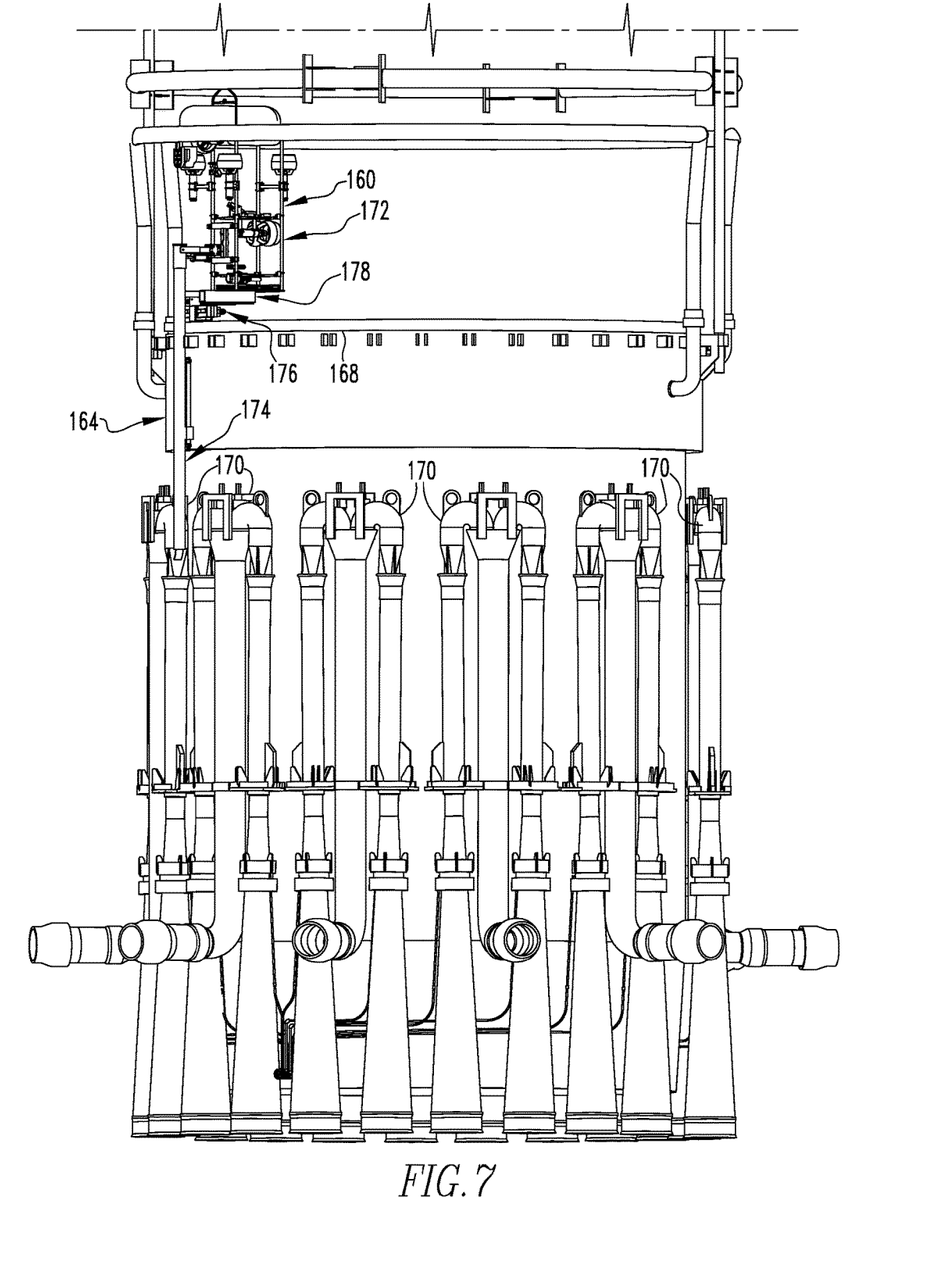
FIG. 7 is a diagrammatic depiction of the submersible machine of FIG. 6 mounted to a steam dam of a nuclear reactor apparatus within a nuclear containment.

The tool 4 is carried by an improved submersible machine 160, as is indicated in FIG. 6, for insertion into a variety of limited access locations within the nuclear containment. The submersible machine 160 is depicted generally in FIGS. 6 and 8 and is further depicted in FIG. 7 as being mounted to a portion of a nuclear reactor apparatus 164 during a testing operation thereof. The exemplary nuclear reactor apparatus 164 is a boiling water reactor (BWR), and the submersible machine 160 is mounted to a steam dam 168 of the nuclear reactor apparatus 164. As is understood in the relevant art, the steam dam 168 is an annular member that is approximately four inches tall, roughly ¼ inch thick and approximately twenty-five feet in diameter. As will be described in greater detail below, the submersible machine 160 is actually movably mounted to the steam dam 168 and thus can carry the tool 4 among a plurality of jet pumps 170 situated about the outer circumference of the nuclear reactor apparatus 164.

Figure 8:
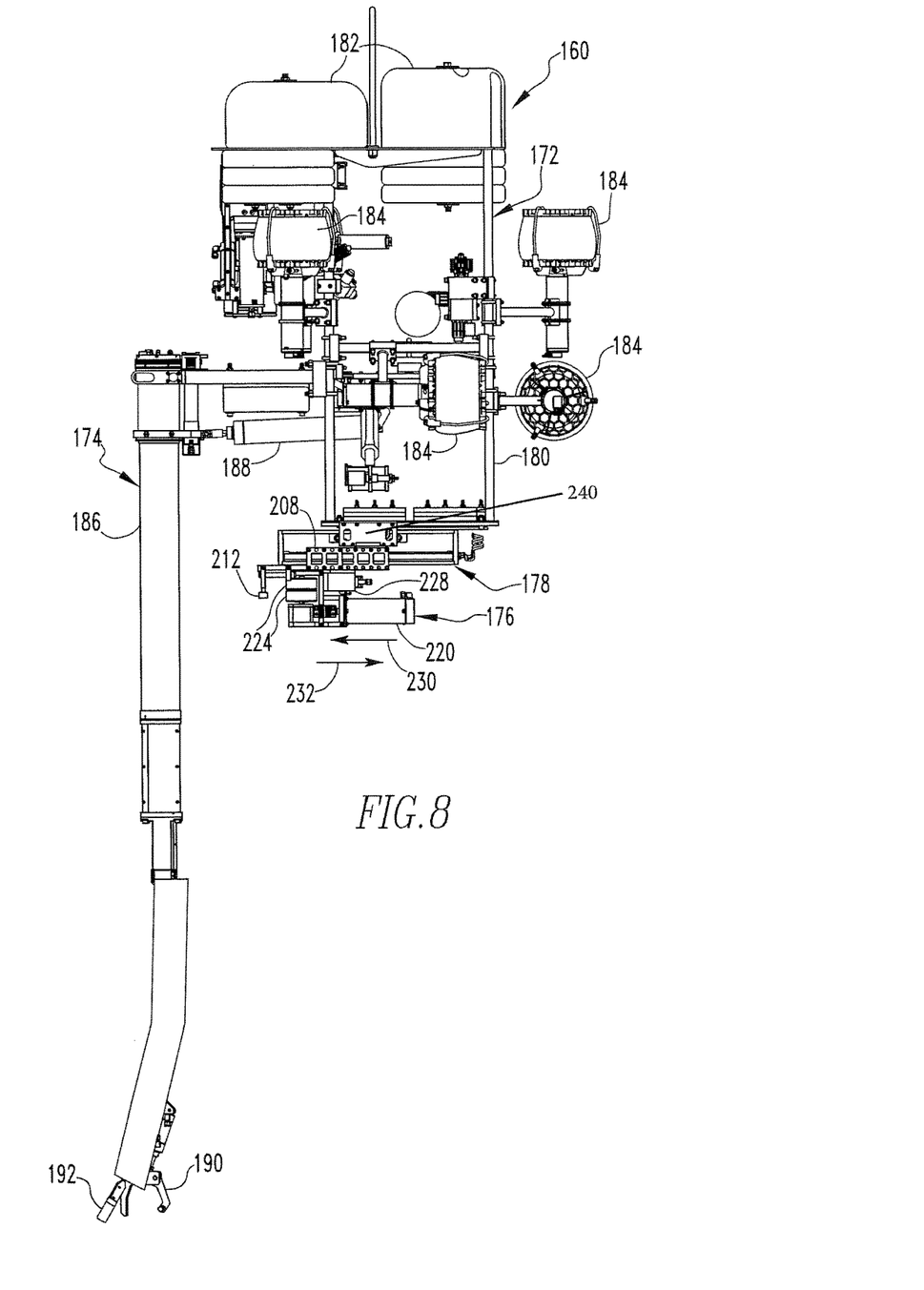
FIG. 8 is an elevational view of the submersible machine of FIG. 6.

As can be understood from FIGS. 6 and 8, the submersible machine 160 can be said to include a transport portion 172, a mast apparatus 174, a mount apparatus 176 and an adjustment table 178. The transport portion 172 includes a frame 180 upon which is mounted a flotation apparatus 182 and a plurality of thrusters 184. The flotation apparatus 182 includes a pair of flotation devices that provide buoyancy that counteracts at least a portion of the weight of the other components of the submersible machine 160. The thrusters 184 are pointed in orthogonal directions and enable the submersible machine 160 to be maneuvered in the fluid environment within the nuclear containment.

The mast apparatus 174 is mounted to the frame 180 and is configured to carry the tool 4 therein. More particularly, the mast apparatus 174 includes a telescoping mast 186 having a pair of openings 187 (FIG. 6) formed therein, one of which receives the tool 4 therein (not expressly depicted in FIG. 6 for purposes of clarity) during a testing operation. The mast 186 is telescoping, i.e., its length in the vertical direction in FIGS. 6 and 8 can be adjusted by a technician during a testing operation to carry the tool 4 in the vertical direction from the perspective of FIG. 7. Moreover, and as is best depicted in FIG. 8, the mast apparatus 174 includes a hydraulic actuator 188 that extends between a portion of the frame 180 and a portion of the mast 186, which enables the mast 186 to be pivoted, i.e., in directions toward and away from the jet pumps 170 of FIG. 7 when the submersible machine 160 is mounted on the steam dam 168. The mast apparatus 174 additionally includes a rotation mechanism that is not expressly depicted herein that enables the mast 186 to be rotated about its axis of elongation. The mast 186 thus is telescoping, pivotable, and rotatable to enable it to be selectively moved into proximity with various limited access location, such as those in the proximity of the jet pumps 170.

Further in this regard, it can be understood from FIGS. 6 and 8 that the mast apparatus 174 additionally includes a clamp 190 and a camera 192 situated at the distal end of the mast 186. Clamp 190 is usable to directly connect, i.e., clamp, the distal end of the mast 186 to a given structure on the nuclear reactor apparatus 164, such as in the vicinity of a limited access location on one of the jet pumps 170. Moreover, the camera 192 is situated in proximity to the clamp 190 in order for a technician to visually ascertain the position of clamp 190 as part of the operation of manipulating the position of the mast 186 and prior to attachment of the clamp 190 onto a structure of the nuclear reactor apparatus 164.

While the clamp 190 is employed to affix the distal end of the mast 186 with respect to a structure within the nuclear containment, it is noted that the mount apparatus 176 advantageously mounts the entire submersible machine 160 onto the nuclear reactor apparatus 164. Thus, the clamp 190 is actually in the nature of a secondary affixing structure which provides some additional support of the mast 186 to the nuclear reactor apparatus 164 in a fashion that is supplemental to the support of the mast 186 this is provided through the mounting of the mount apparatus 176, and thus the frame 180, onto the nuclear reactor apparatus 164.

Figure 9:
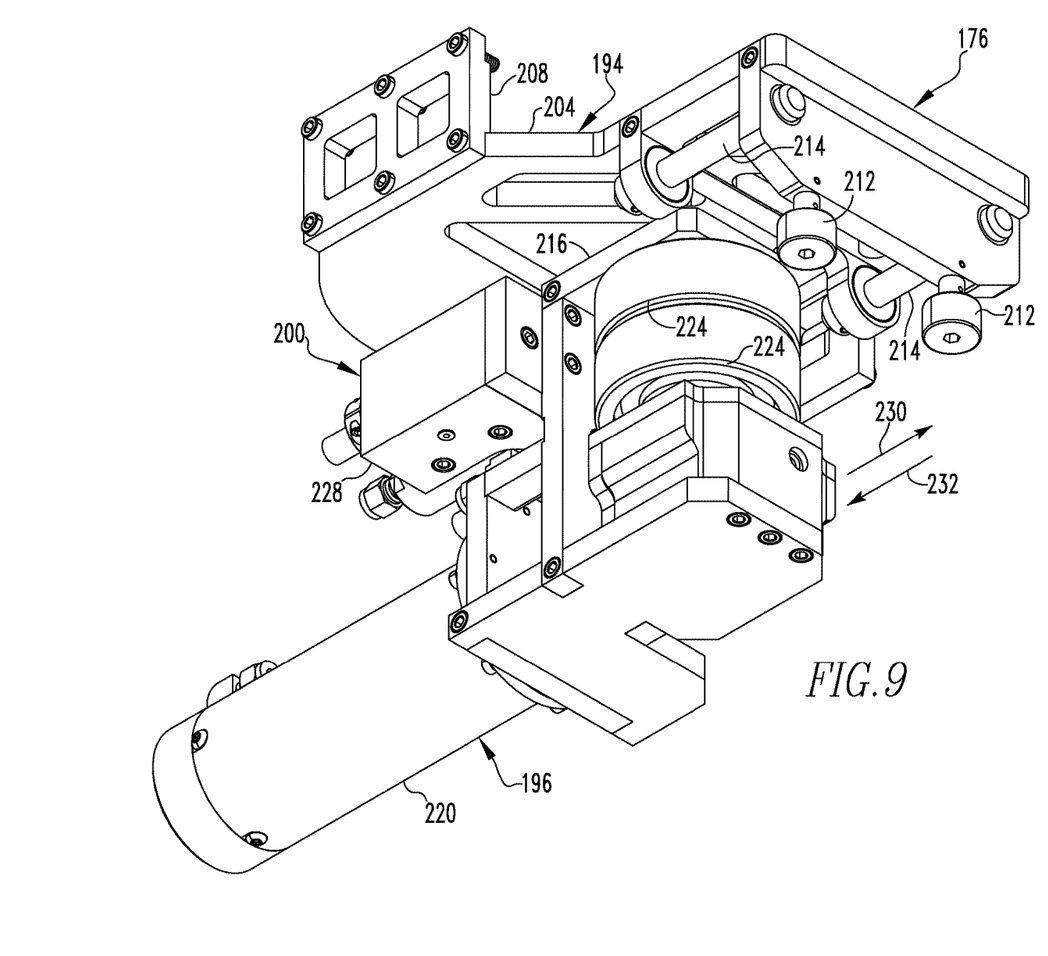
FIG. 9 is a perspective view of a mount apparatus of the submersible machine of FIGS. 6 and 8.

More particularly, and as best can be seen in FIG. 9, the mount apparatus 176 can be said to include a mounting system 194, a drive apparatus 196 and an engagement apparatus 200. The mounting system 194 enables the mount apparatus 176 to be connected with the adjustment table 178. The engagement apparatus 200 can be used to connect the mount apparatus 176 with the steam dam 168 or other structure of the nuclear reactor apparatus 164. The drive apparatus 196 is usable to drive the mount apparatus 176, and thus the entire submersible machine 160, about the circumferential extent of the steam dam 168.

The mounting system 194 can more particularly be said to include a base plate 204, and can further be said to include a pair of connection plates 208, a pair of first rollers 212, and a pair of second rollers 214 that are all mounted to the base plate 204. The connection plates 208 are connectible to a mounting block 264 (FIGS. 10A-10E) of the adjustment table 178. The pair of first rollers 212 and the pair of second rollers 214 are engageable with the steam dam 168 as will be described in greater detail below.

The drive apparatus 196 can be said to include a housing 216, a motor 220, and a number of wheels 224. The motor 220 is operable to drive either or both of the wheels 224 which, as will be explained in greater detail below, are engageable with the steam dam 168 when the submersible machine 160 is mounted to the nuclear reactor apparatus 164. As such, the motor 220 drives one or more of the wheels 224 to move the submersible machine 160 about the circumference of the steam dam 168, as needed.

The engagement apparatus 200 can be said to include a pneumatic cylinder 228 that can be energized to move the drive apparatus 196 in an engagement direction generally toward the first pair of roller 212 as is indicated in FIG. 9 with the arrow 230. The pneumatic cylinder 228 can also be energized to move the drive apparatus 196 in a disengagement direction generally away from the first pair of roller 212 as is indicated in FIG. 9 with the arrow 232. When the drive apparatus 196 is moved in the engagement direction 230 into engagement with the steam dam 168, the wheels 224 and the first pair of rollers 212 serve as brace elements that are cooperable to engage the steam dam 168 therebetween and to thereby mount the mount apparatus 176 (and thus the submersible machine 160) to the steam dam 168 (and thus to the nuclear reactor apparatus 164). The pneumatic pressure within the pneumatic cylinder 228 maintains the compressive engagement of the steam dam 168 between the wheels 224 and the first pair of rollers 212. In such a situation, if the motor 220 is actuated, the motile force of the motor 220 is transferred to one or both of the wheels 224, which drive the submersible machine 160 along the circumferential extent of the steam dam 168. In such a situation, the first pair of rollers 212 roll against an arcuate surface of the annular steam dam 168 that is opposite the arcuate surface of the steam dam 168 that is engaged by the wheels 224.

When the pneumatic cylinder 228 is oppositely operated, the drive apparatus 196 is moved in the disengagement direction 232. This enables the submersible machine 160 to be removed from the nuclear reactor apparatus 164.

It can be understood from the foregoing, therefore, that the mount apparatus 176 is usable to mount the submersible machine 160 onto the steam dam 168 of the nuclear reactor apparatus 164. However, such mounting of the submersible machine 160 to the steam dam 168 does not necessarily position the mast apparatus 174 in its most advantageous position for access to the limited access locations within the nuclear containment. Advantageously, therefore, the adjustment table 178, which can be said to be interposed between the mount apparatus 176 and the frame 180 of the transport portion 172, enables fine adjustment of the position of the frame 180 (and thus the mast apparatus 174) with respect to the steam dam 168. That is, the initial mounting of the mount apparatus 176 to the steam dam 168 provides a gross or initial positioning of the transport portion 172, but the adjustment table 178 enables the frame 180 and components mounted thereto to be repositioned with fine tuning in radial and tangential directions (with respect to the center of the steam dam 168) in order to facilitate the positioning of the mast 186 with respect to the jet pumps 170 or other limited access locations.

More particularly, and as can be understood from FIGS. 10A-10E, the adjustment table 178 includes a first platform apparatus 234 and a second platform apparatus 236 that are connected together. The first platform apparatus 234 is connected with the frame 180, and the second platform apparatus 236 is connected with the mount apparatus 176.

The movable connection between the first and second platform apparatuses 234 and 236 advantageously enables selected movement between the frame 180 and the mount apparatus 176 to effect the aforementioned fine tuning of the position of the mast 186.

The first platform apparatus 234 can be said to include a connection plate 240 that is connected with the frame 180, and a first translation mechanism 244 that includes a first pair of parallel guide rods 248. As can be understood from FIGS. 10A-10E, the second platform apparatus 236 is moveably disposed on the first pair of parallel guide rods 248. The actual mechanism that provides the motile force for moving the second platform apparatus 236 along the first pair of guide rods 248 is not expressly depicted herein, but is understood that any of a wide variety of appropriate mechanisms such as screw mechanisms, hydraulic mechanisms, and the like can be employed to move the second platform apparatus 236 along the first pair of guide rods 248.

The second platform apparatus 236 can be said to include a support plate 252 upon which is disposed a second translation mechanism 256 that includes a second pair of parallel guide rods 260. The second platform apparatus 236 can be said to also include the mounting block 264 that is movably disposed on the second pair of guide rods 260. Again, the precise mechanism that is employed in providing the motile force to move the mounting block 264 along the second pair of guide rods 260 is not expressly depicted herein, but it is understood that any of a wide variety of mechanisms such as screw mechanisms, hydraulic mechanisms, and the like can be used without departing from the present concept.

Figure 10A:
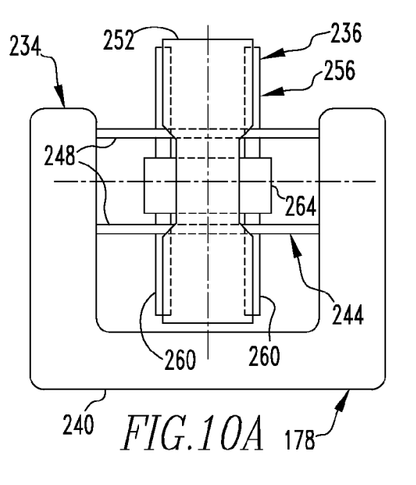
FIGS. 10A-E depict various movements of an improved adjustment table of the submersible machine of FIGS. 6 and 8.
Figure 10B:
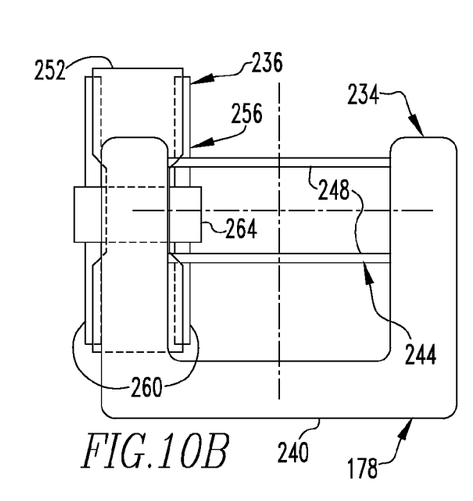
Figure 10C:
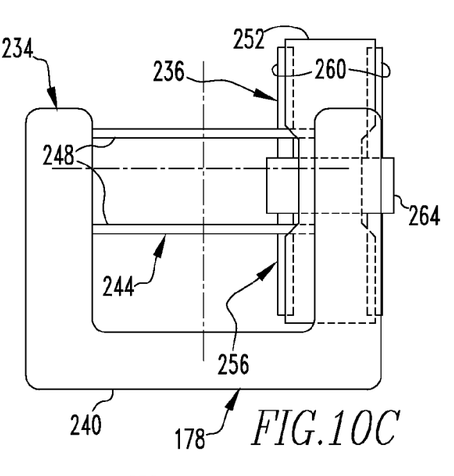
Figure 10D:
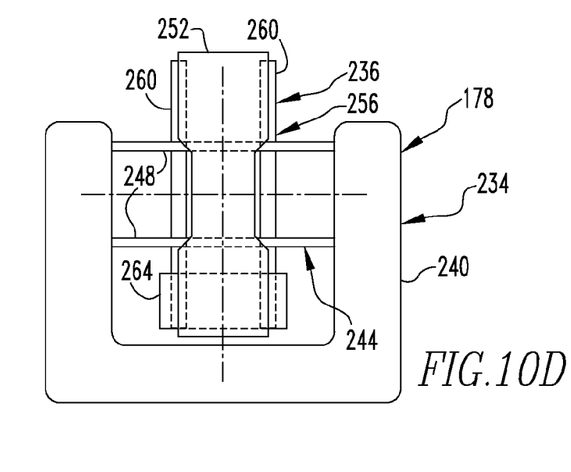
Figure 10E:
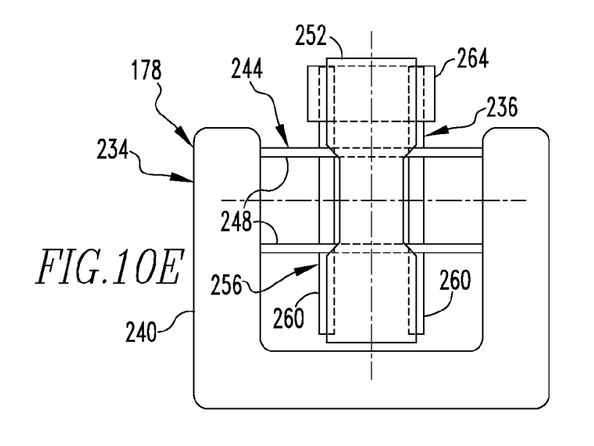

As can be understood from FIGS. 10A-10C, the second platform apparatus 236 is translatable upon the first pair of guide rods 248 between a pair of extreme positions (which are depicted in FIGS. 10B and 10C). FIG. 10A depicts an exemplary center position of the adjustment table 178. FIGS. 10D and 10E depict the mounting block 264 likewise being movable between extremes positions along a direction that is substantially perpendicular to the direction of movement of the second platform apparatus 236 along the first pair of guide rods 248. It is expressly noted that the mounting block 264 is moveable in a first direction (which is the vertical direction with respect to FIGS. 10A-10E) independently of its movement in a second direction (which is the horizontal direction with respect to FIGS. 10A-10E). It is also expressly noted that while FIGS. 10A-10E appear to depict the mounting block 264 as being moved among a plurality of positions with respect to the connection plate 240, it is to be understood that FIGS. 10A-10E are more particularly intended to illustrate that once the mount apparatus 176 is engaged with and mounted to the steam dam 168, the adjustment table 178 can be adjusted to reposition the connection plate 240 and thus the frame 180 among various positions with respect to the relatively stationary mount apparatus 176. It is noted that neither the frame 180 nor the mount apparatus 176 are depicted in FIGS. 10A-10E for purposes of simplicity of disclosure.

It thus can be seen that the advantageous submersible machine 160 enables a relatively simple engagement of its mount apparatus 176 with the steam dam 168 of the nuclear reactor apparatus 164, which mounting can be effected more easily than previous connections between known submersible machines and structures within a nuclear containment. Once the submersible machine 160 is mounted to the steam dam 168, such as by operating the pneumatic cylinder 228 to engage the steam dam 168 between the wheels 224 and the first pair of rollers 212, the adjustment table 178 is adjusted in the two directions indicated in FIGS. 10A-10E to provide a more finely tuned positioning of the mast apparatus 174 with respect to the jet pumps 170. The mast 186 can then be telescoped and/or pivoted and/or rotated in order to position its distal end at a desired location, and the camera 192 can be employed to assist in the supplementary support provided by attaching the clamp 190 to a desired position on a jet pump 170.

The tool 4 can then be deployed into the limited access location, such as a limited access location within one of the jet pumps 170, and the bracing arms 60 can be deployed to support the tool 4 within the jet pump 170. The mounting arms 52 can then be deployed to move the testing element 12 about the interior of the jet pump 170 to perform the inspection. The advantageous configuration of the connection apparatus 84 and the other components of tool 4 enable the cable 20 to move within the interior of the tool 4, with such movements being within the elastic limits of the cable 20 and while avoiding any meaningful risk of stretching or breaking of the cable 20. However, the configuration of the connection apparatus 84 further enables the testing apparatus 8 to be replaced if needed.

Once testing has been completed within a given limited access location within the nuclear containment, the tool 4 can be withdrawn and retained in the mast 186. The drive apparatus 196 of the mount apparatus 176 can then be actuated to drive the submersible machine 160 to a different circumferential position along the steam dam 168 to enable inspection of another limited access location, such as a location within an adjacent jet pump 170 or other such location. In so doing, the mast 186 can be moved as necessary to avoid other potentially interfering structures of the nuclear reactor apparatus 164. Moreover, the second pair of rollers 214 are rollingly engageable with an upper edge of the steam dam 168 in the event that the engagement of the mount apparatus 176 with the steam dam 168 is not perfectly orthogonal.

Advantageously, therefore, the improved tool 4 and the improved submersible machine 160 enable testing to occur and to be completed relatively more rapidly than was previously possible. Moreover, the accuracy and reliability of such testing is improved due to the enhanced data quality resulting from avoiding the use of slip rings and the like. Other advantages will be apparent.

The present disclosure may be embodied in other specific forms without departing from its spirit or essential characteristics. The described embodiments are to be considered in all respects only as illustrative and not restrictive. The scope of the disclosure is, therefore, indicated by the appended claims rather than by the foregoing description. All changes that come within the meaning and range of equivalency of the claims are to be embraced within their scope.

What is claimed is:

1. A submersible machine structured to carry a tool to a limited access location within a nuclear containment, to become mounted to and to be driven along a structural portion of a reactor apparatus within the nuclear containment, and to insert at least a portion of the tool into the limited access location, the submersible machine comprising:

a transport portion comprising a frame, at least a first flotation device disposed on the frame, and a number of thrusters mounted to the frame and structured to be actuated to move the frame through a fluid environment within the nuclear containment;

an adjustment table comprising a first platform apparatus having a first translation mechanism and a second platform apparatus having a second translation mechanism, the first and second platform apparatuses being connected together, the first platform apparatus being connected with the frame, at least one of the first platform apparatus and the second platform apparatus being movable in a plane with respect to the other of the first platform apparatus and the second platform apparatus;

a mount apparatus connected with the second platform apparatus and comprising a drive apparatus and a number of brace elements, the drive apparatus comprising a motor and a wheel, the wheel and at least a first brace element of the number of brace elements being cooperable to engage therebetween the structural portion of the reactor apparatus within the nuclear containment and to thereby mount the mount apparatus to the reactor apparatus, the motor being actuatable to transfer motile force to the wheel to drive the submersible machine along the reactor apparatus;

the second translation mechanism being operable independently of the motor to move the first platform apparatus along a direction in the plane with respect to the mount apparatus when the mount apparatus is mounted to the structural portion of the reactor apparatus, the direction being one of a radial direction and a tangential direction with respect to the reactor apparatus;

the first translation mechanism being operable independently of the second translation mechanism to move the frame with respect to the second platform apparatus along another direction in the plane that is transverse to the direction and that is the other of a radial direction and a tangential direction with respect to the reactor apparatus; and a mast apparatus mounted to the frame and comprising a mast that is structured to carry the tool, the mast apparatus being operable independently of the first translation mechanism to move the mast with respect to the frame.

2. The submersible machine of claim 1 wherein the mast is an elongated telescoping member.

3. The submersible machine of claim 2 wherein the mast is additionally pivotable with respect to the frame.

4. The submersible machine of claim 3 wherein the mast is additionally rotatable about its axis of elongation.

5. The submersible machine of claim 1 wherein the mount apparatus further comprises an engagement apparatus structured to move the wheel independently of operation of the motor into engagement with the structural portion of the reactor apparatus.

6. The submersible machine of claim 1 wherein the first platform apparatus and the second platform apparatus are movable independently of one another in directions orthogonal to one another.

7. The submersible machine of claim 5 wherein the number of brace elements comprise a pair of rollers, the wheel being structured to compressively engage the structural portion of the reactor apparatus between the wheel and the pair of rollers.

8. A submersible machine structured to carry a tool to a limited access location within a nuclear containment, to become mounted to and to be driven along a structural portion of a reactor apparatus within the nuclear containment, and to insert at least a portion of the tool into the limited access location, the submersible machine comprising:

a transport portion comprising a frame, at least a first flotation device disposed on the frame, and a number of thrusters mounted to the frame and structured to be actuated to move the frame through a fluid environment within the nuclear containment;

an adjustment table comprising a first platform apparatus having a first translation mechanism and a second platform apparatus having a second translation mechanism, the first and second platform apparatuses being connected together, the first platform apparatus being connected with the frame, at least one of the first platform apparatus and the second platform apparatus being movable in a plane with respect to the other of the first platform apparatus and the second platform apparatus;

a mount apparatus connected with the second platform apparatus and comprising a drive apparatus and a number of brace elements, the drive apparatus comprising a motor and a wheel, the wheel and at least a first brace element of the number of brace elements being cooperable to engage therebetween the structural portion of the reactor apparatus within the nuclear containment and to thereby mount the mount apparatus to the reactor apparatus, the motor being actuatable to transfer motile force to the wheel to drive the submersible machine along the reactor apparatus;

the second translation mechanism being operable independently of the motor to move the first platform apparatus along a direction in the plane with respect to the mount apparatus when the mount apparatus is mounted to the structural portion of the reactor apparatus;

the first translation mechanism being operable independently of the second translation mechanism to move the frame with respect to the second platform apparatus along another direction in the plane that is transverse to the direction;

a mast apparatus mounted to the frame and comprising a mast that is structured to carry the tool, the mast apparatus being operable independently of the first translation mechanism to move the mast with respect to the frame; and wherein the mast is an elongated member that telescopes along its axis of elongation, that is rotatable about its axis of elongation, and that is pivotable with respect to the frame independently of the first translation mechanism.

* * * * *